(12) United States Patent
Yoshizumi

(10) Patent No.: US 11,969,923 B2
(45) Date of Patent: Apr. 30, 2024

(54) METHOD FOR MANUFACTURING IRON CORE PRODUCT

(71) Applicant: MITSUI HIGH-TEC, INC., Fukuoka (JP)

(72) Inventor: Kenyu Yoshizumi, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 74 days.

(21) Appl. No.: 17/744,951

(22) Filed: May 16, 2022

(65) Prior Publication Data

US 2022/0362974 A1 Nov. 17, 2022

(30) Foreign Application Priority Data

May 17, 2021 (JP) ................................ 2021-083365

(51) Int. Cl.
| | |
|---|---|
| *B29C 45/14* | (2006.01) |
| *B29K 105/20* | (2006.01) |
| *B29K 705/12* | (2006.01) |
| *B29L 31/00* | (2006.01) |

(52) U.S. Cl.
CPC .. *B29C 45/14065* (2013.01); *B29C 45/14336* (2013.01); *B29C 45/14778* (2013.01); *B29K 2105/203* (2013.01); *B29K 2705/12* (2013.01); *B29K 2995/0008* (2013.01); *B29L 2031/7498* (2013.01)

(58) Field of Classification Search
CPC ........ B29C 45/14065; B29C 45/14336; B29C 45/14778
See application file for complete search history.

(56) References Cited

U.S. PATENT DOCUMENTS

| | | | |
|---|---|---|---|
| 2016/0056694 A1* | 2/2016 | Mabu .................... | H02K 15/12 29/598 |
| 2019/0044423 A1* | 2/2019 | Fukuyama ............. | H02K 11/21 |
| 2021/0273503 A1 | 9/2021 | Asano et al. | |
| 2022/0399789 A1* | 12/2022 | Sasaki ................... | H02K 15/02 |

FOREIGN PATENT DOCUMENTS

| | | |
|---|---|---|
| JP | 2019-161828 | 9/2019 |
| JP | 2020-88879 | 6/2020 |

* cited by examiner

*Primary Examiner* — Edmund H Lee
(74) *Attorney, Agent, or Firm* — GREENBLUM & BERNSTEIN, P.L.C.

(57) ABSTRACT

There are provided a method and a device for manufacturing an iron core product, including: holding first and second inserts by first and second holding portions provided in a holding unit; and then displacing at least one of the first holding portion and the second holding portion such that a posture of the first insert corresponds to an opening of a first receiving portion provided in a first main surface of a first receiver and a posture of the second insert corresponds to an opening of a second receiving portion provided in the first main surface; thereafter inserting the first insert from the first holding portion into the first receiving portion and inserting the second insert from the second holding portion into the second receiving portion in a state where the holding unit is arranged to face the first main surface.

7 Claims, 9 Drawing Sheets

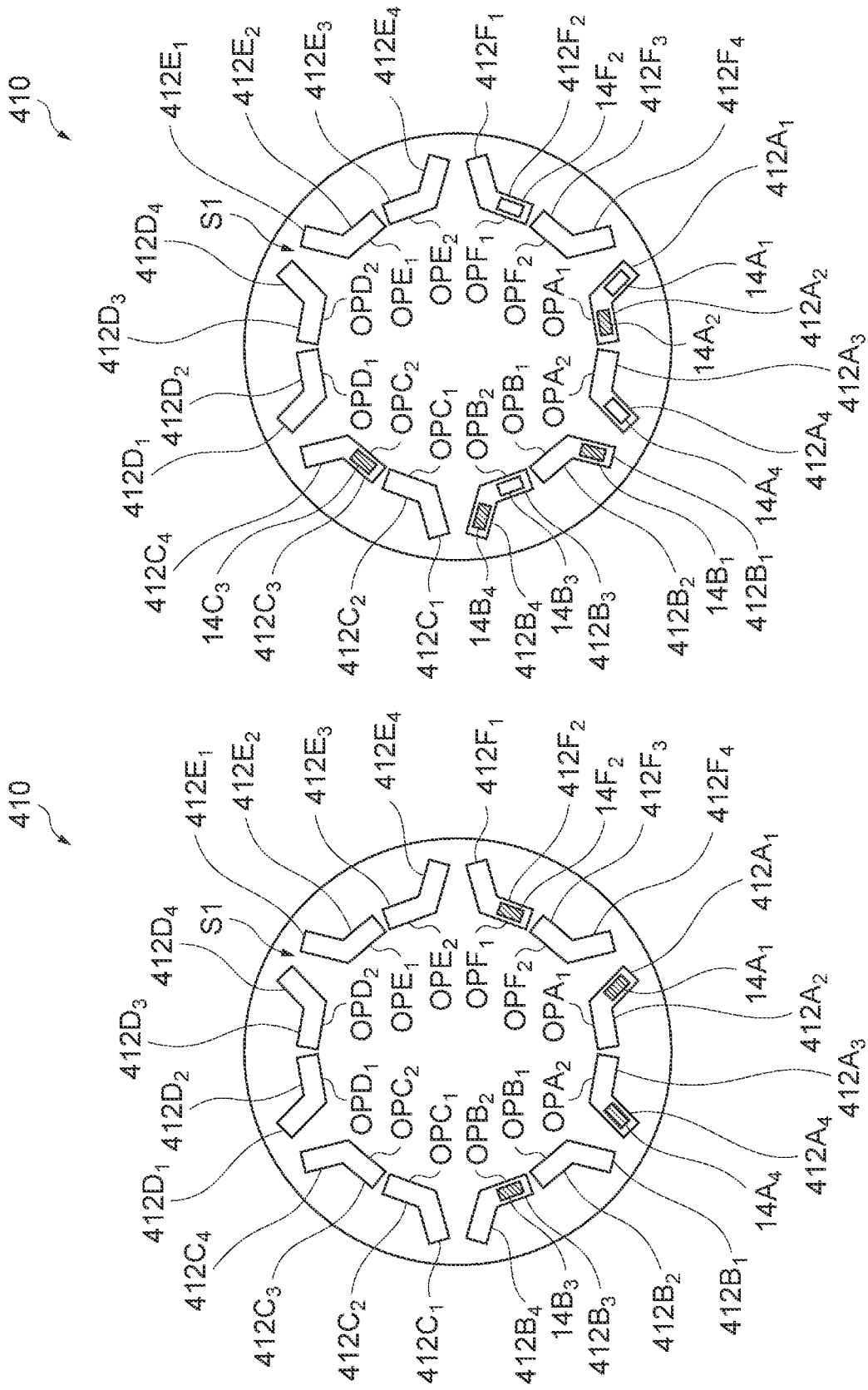

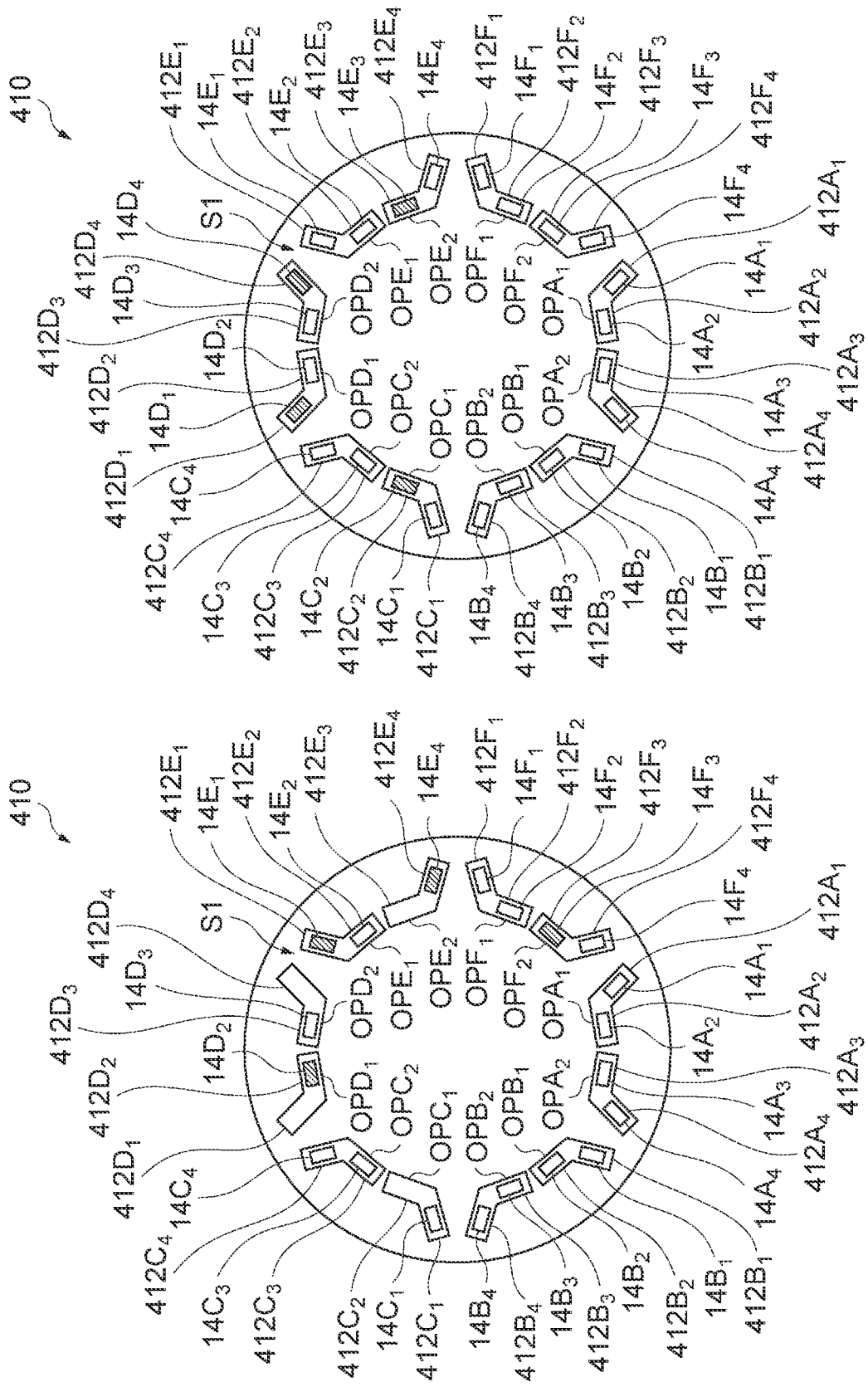

METHOD FOR MANUFACTURING IRON CORE PRODUCT

This application is based on and claims priority under 35 USC 119 from Japanese Patent Application No. 2021-083365 filed on May 17, 2021, the contents of which are incorporated herein by reference.

TECHNICAL FIELD

The present disclosure relates to a method for manufacturing an iron core product and a device for manufacturing an iron core product.

BACKGROUND ART

JP2019-161828A and JP2020-088879A disclose a rotor including a body (core) provided with a plurality of magnet insertion holes extending in an extending direction of a rotation axis, and a plurality of permanent magnets respectively arranged in the plurality of magnet insertion holes.

SUMMARY OF INVENTION

The present disclosure describes a method for manufacturing an iron core product and a device for manufacturing an iron core product capable of efficiently producing iron core products.

According to an illustrative aspect of the present disclosure, a method for manufacturing an iron core product, includes: a first operation of holding a first insert by a first holding portion provided in a holding unit and holding a second insert by a second holding portion provided in the holding unit; after the first operation, a second operation of displacing at least one of the first holding portion and the second holding portion such that a posture of the first insert corresponds to an opening of a first receiving portion provided in a first main surface of a first receiver and a posture of the second insert corresponds to an opening of a second receiving portion provided in the first main surface; and after the second operation, a third operation of inserting the first insert from the first holding portion into the first receiving portion and inserting the second insert from the second holding portion into the second receiving portion in a state where the holding unit is arranged to face the first main surface.

According to another illustrative aspect of the present disclosure, a device for manufacturing an iron core product, includes: a receiver including a first main surface, a first receiving portion provided with an opening in the first main surface, and a second receiving portion provided with an opening in the first main surface; a holding unit including a first holding portion configured to hold a first insert and a second holding portion configured to hold a second insert; and a control unit. The control unit is configured to execute: a first process of controlling the first holding portion and the second holding portion so as to cause the first holding portion to hold the first insert and cause the second holding portion to hold the second insert; after the first operation, a second process of controlling the holding unit to displace at least one of the first holding portion and the second holding portion such that a posture of the first insert corresponds to the opening of the first receiving portion and a posture of the second insert corresponds to the opening of the second receiving portion; after the second operation, a third process of controlling at least one of the receiver and the holding unit to arrange the holding unit relative to the receiver such that the holding unit faces the first main surface; and after the third operation, a fourth process of controlling the holding unit to insert the first insert from the first holding portion into the first receiving portion and insert the second insert from the second holding portion into the second receiving portion.

According to the method for manufacturing an iron core product and the device for manufacturing an iron core product according to the present disclosure, iron core products can be efficiently produced.

BRIEF DESCRIPTION OF DRAWINGS

FIGS. 7A and 7B show the method of inserting the insert into the insertion jig.

FIGS. 9A and 9B show the method of inserting the insert into the insertion jig.

DESCRIPTION OF EMBODIMENTS

Figure 1:
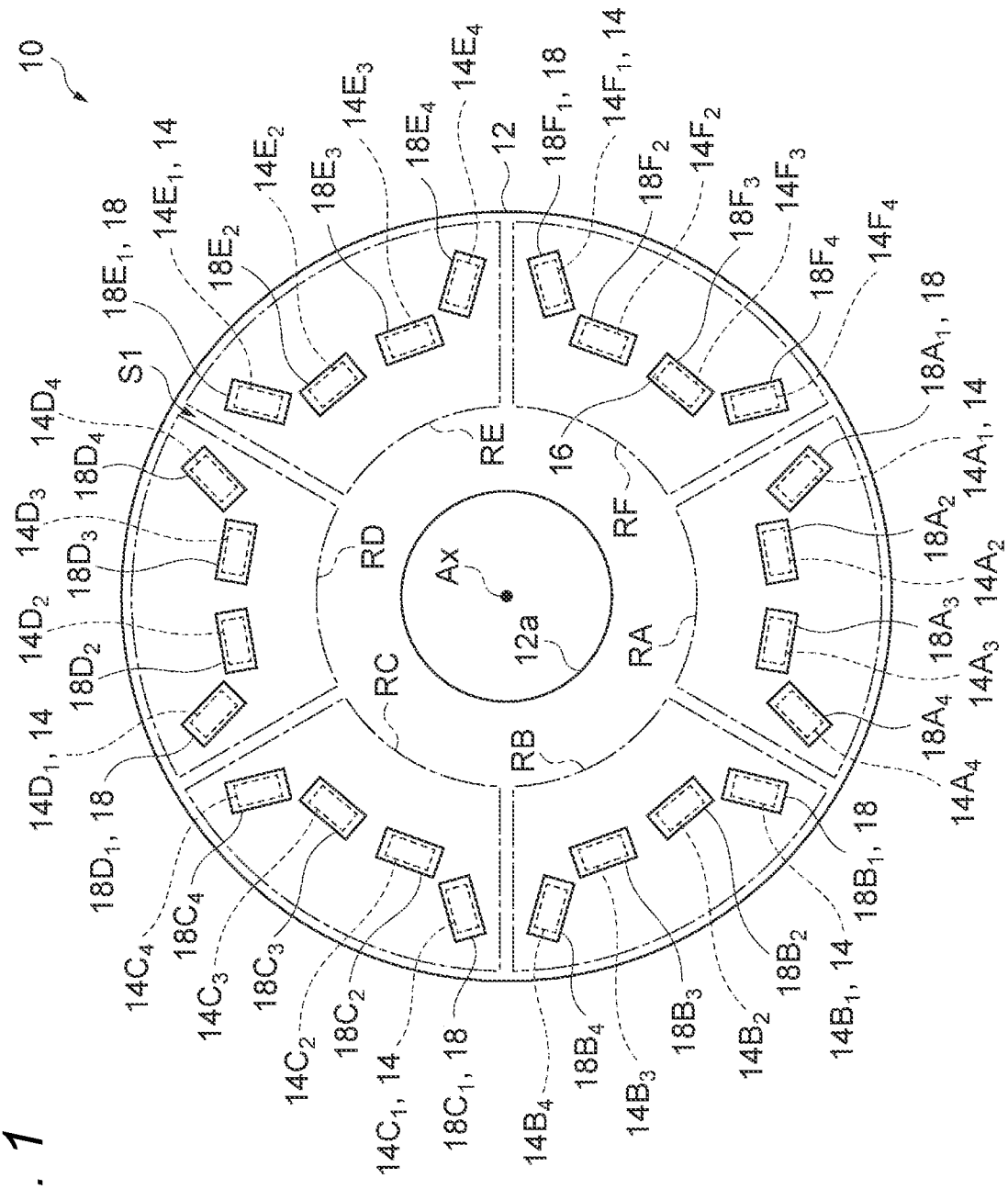
FIG. 1 is a front view showing an example of a rotor laminated iron core.

In the following description, the same element or elements having the same function will be denoted by the same reference numeral, and redundant description thereof will be omitted. In the present specification, the terms "up", "down", "right", and "left" in the drawings are based on directions of reference numerals in the drawings.

Rotor Laminated Iron Core

First, a configuration of a rotor laminated iron core 10 (iron core product) will be described with reference to FIG. 1. The rotor laminated iron core 10 includes a laminate 12 (receiver), a plurality of inserts 14, and a plurality of solidified resins 16.

The laminate 12 has a cylindrical shape. A shaft hole 12a penetrating the laminate 12 is provided in a central portion of the laminate 12 so as to extend along a central axis Ax. The shaft hole 12a extends in a lamination direction (height direction) of the laminate 12 (hereinafter, the lamination direction of the laminate 12 is simply referred to as the "lamination direction"). Since the laminate 12 rotates around the central axis Ax, the central axis Ax is also a rotation axis. A shaft is inserted into the shaft hole 12a.

A plurality of receiving portions 18 are formed in the laminate 12. In the example of FIG. 1, 24 receiving portions 18 are formed in the laminate 12. The receiving portions 18 may be arranged at predetermined intervals along an outer peripheral edge of the laminate 12. Each receiving portion 18 may be a through hole that penetrates from one main surface S of the laminate 12 to the other main surface (not shown) located on an opposite side so as to extend along the central axis Ax. The receiving portion 18 may also be a recessed portion that extends from the one main surface S of the laminate 12 along the central axis Ax but does not reach the other main surface.

When the main surface S of the laminate 12 is viewed from the lamination direction, an opening shape and a direction of an opening of the receiving portion 18 in the main surface S are not particularly limited. The opening shape of the receiving portion 18 in the main surface S may be, for example, a rectangular shape, an arc shape, a bent shape, or the like. In the example shown in FIG. 1, the opening of the receiving portion 18 in the main surface S has a rectangular shape.

Figure 3:
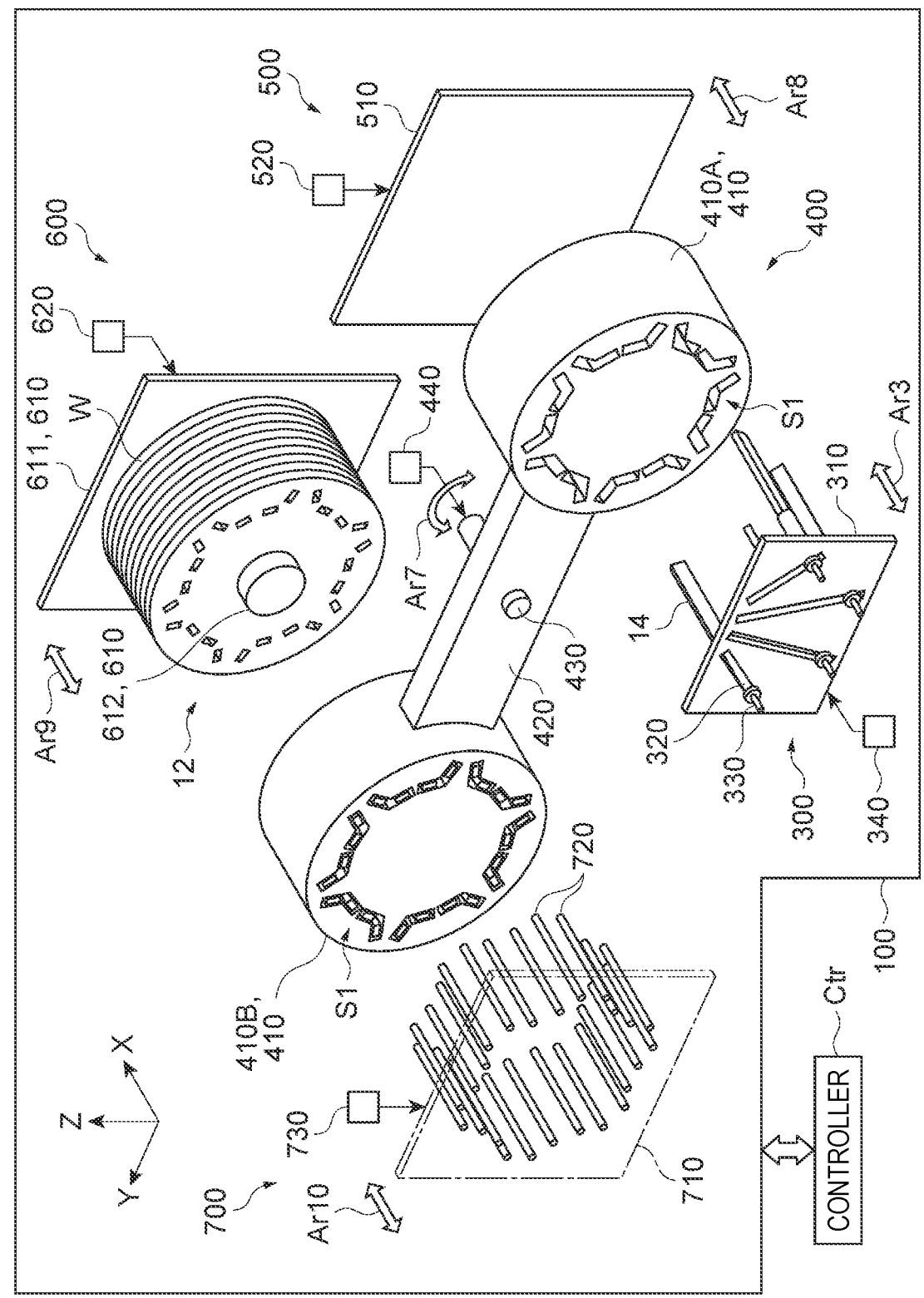
FIG. 3 is a perspective view showing a part of the example of the insertion device.

The laminate 12 is formed by laminating a plurality of blanked members W (see FIG. 3). Each blanked member W is a plate-like member obtained by blanking a metal plate (for example, an electromagnetic steel plate) into a predetermined shape, and has a shape corresponding to the laminate 12. The blanked members W adjacent to each other in the height direction may be fastened to each other by caulking, may be adhered to each other by an adhesive, or may be joined to each other by welding. The laminate 12 may be formed by so-called rotating lamination or skew.

Each insert 14 may be a magnetic material such as a permanent magnet, for example. A shape of the insert 14 is not particularly limited, and may be, for example, a quadrangular prism shape. One insert 14 may be inserted into one receiving portion 18, or a plurality of inserts 14 may be inserted into one receiving portion 18. In the example of FIG. 1, each insert 14, which is a permanent magnet, is inserted into each receiving portion 18 one by one. In this case, the rotor laminated iron core 10 includes 24 inserts 14.

Each solidified resin 16 is a solidified material of molten resin filled in the receiving portion 18 in which the insert 14 is arranged. The solidified resin 16 may be configured to fix the insert 14 in the receiving portion 18. The solidified resin 16 may also be configured to join the blanked members W adjacent to each other in the lamination direction. In the example of FIG. 1, the rotor laminated iron core 10 includes 24 solidified resins 16, the number of which is the same as that of the receiving portions 18.

Here, when the main surface S of the laminate 12 is viewed from the lamination direction, the main surface S may include a plurality of regions (six regions RA to RF in the example of FIG. 1). The plurality of regions may be arranged along the outer peripheral edge of the laminate 12. In the example of FIG. 1, the regions RA to RF may be arranged clockwise relative to the central axis Ax when the main surface S is viewed from the lamination direction.

Each of the regions RA to RF may constitute one magnetic pole of the rotor laminated iron core 10. In each of the regions RA to RF, a receiving portion group including the same number of receiving portions 18 (four receiving portions 18 in the example of FIG. 1) may be arranged.

In the present specification, the four receiving portions 18 arranged in the region RA are referred to as "receiving portions 18A", and these four receiving portions 18A are referred to as a "receiving portion $18A_1$", a "receiving portion $18A_2$", a "receiving portion $18A_3$", and a "receiving portion $18A_4$", respectively. The receiving portions $18A_1$ to $18A_4$ may be arranged clockwise relative to the central axis Ax when the main surface S is viewed from the lamination direction. In addition, the inserts 14 inserted into the receiving portions $18A_1$ to $18A_4$ are referred to as an "insert $14A_1$", an "insert $14A_2$", an "insert $14A_3$", and an "insert $14A_4$", respectively. The same applies to the receiving portions 18 and the inserts 14 in the other regions RB to RF.

In the example shown in FIG. 1, the receiving portions $18A_1$ and $18A_4$ extend along a radial direction such that end portions thereof on a side closer to the central axis Ax face an inner side of the region RA. The receiving portions $18A_2$ and $18A_3$ extend along a peripheral direction. An end portion, which is located on a peripheral direction outer side in the region RA, of the receiving portion $18A_2$ faces an end portion, which is located on a side closer to the central axis Ax, of the receiving portion $18A_1$. An end portion, which is located on the peripheral direction outer side in the region RA, of the receiving portion $18A_3$ faces an end portion, which is located on a side closer to the central axis Ax, of the receiving portion $18A_4$. Therefore, in the example shown in FIG. 1, the receiving portions $18A_1$ to $18A_4$ are arranged in a shape of a numeral "3" or a letter "M" in the region RA as a whole.

Insertion Device

Figure 2:
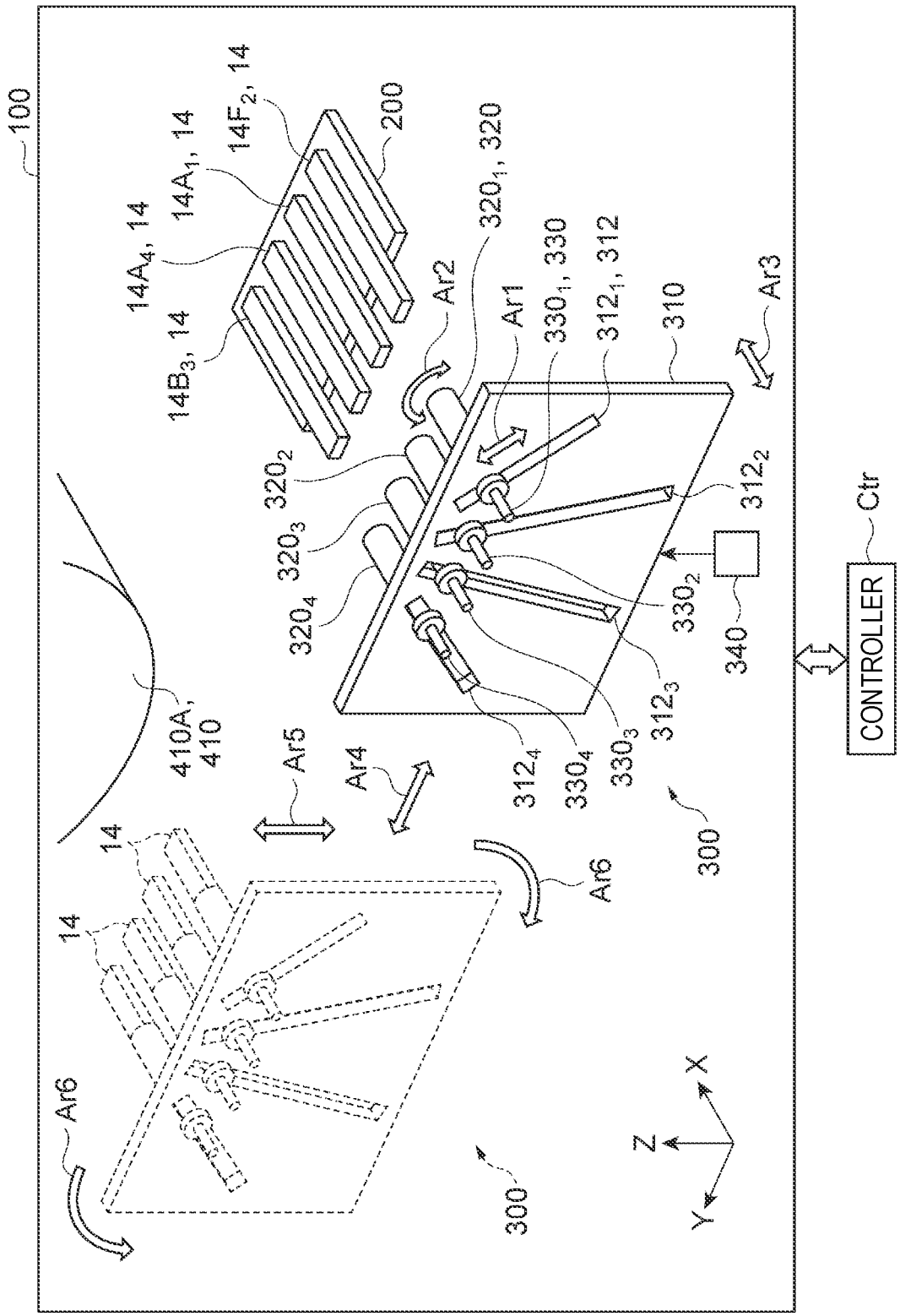
FIG. 2 is a perspective view showing a part of an example of an insertion device.

Next, a configuration of an insertion device 100 (a device for manufacturing an iron core product) will be described with reference to FIGS. 2 to 5. The insertion device 100 is configured to insert the insert 14 into the receiving portion 18. As shown in FIGS. 2 and 3, the insertion device 100 includes a measurement unit 200, a holding unit 300, a jig unit 400, a closing unit 500, a holding unit 600, a push-out unit 700, and a controller Ctr (control unit).

The measurement unit 200 is configured to support the plurality of inserts 14 such that one end portion of each insert 14 is located in the air. For example, the measurement unit 200 may be configured to support the same number of inserts 14 (four inserts 14 in the example of FIG. 2) as the number of receiving units 18 arranged in each of the regions RA to RF of the laminate 12. The plurality of inserts 14 may be supported by the measurement unit 200 so as to be substantially horizontally arranged in a line at predetermined intervals. As shown in FIG. 2, the measurement unit 200 is configured to measure weight of each placed insert 14 and to transmit such data to the controller Ctr.

The holding unit 300 is configured to operate based on a control signal from the controller Ctr, hold the plurality of inserts 14 supported by the measurement unit 200, and change (displace) positions and/or postures of the inserts 14. The holding unit 300 includes a base portion 310, a plurality of holding portions 320, a plurality of push-out members 330, and a driving portion 340.

The base portion 310 is configured to support the plurality of holding portions 320. As shown in FIG. 2, the base portion 310 may have a plate-like shape expanding along a vertical direction. The base portion 310 is provided with a plurality of guide paths 312. In the example of FIG. 2, the base portion 310 is provided with four guide paths 312. These guide paths 312 are referred to as a "guide path $312_1$", a "guide path $312_2$", a "guide path $312_3$", and a "guide path $312_4$" in order from the right to the left in FIG. 2.

Each guide path 312 is configured to guide each holding portion 320 along an extending direction of the guide path 312. The guide path 312 may have a linear shape, a curved shape, or a bent shape. The guide path 312 may be configured to be engaged with a base end portion of the holding portion 320. For example, the guide path 312 may be an elongated hole that penetrates the base portion 310 (see the example of FIG. 2), a recessed groove that does not penetrate the base portion 310, or a protrusion (rail) that protrudes from a main surface of the base portion 310.

In the example of FIG. 2, the guide paths $312_1$ to $312_4$ are linear elongated holes extending along an up-down direction. Upper end portions of the guide paths $312_1$ to $312_4$ are arranged in a horizontal direction at intervals substantially equal to intervals between the plurality of inserts 14 supported by the measurement unit 200. The guide paths $312_1$ to $312_4$ extend outward in the horizontal direction as the guide paths $312_1$ to $312_4$ extend downward. Positions of lower end portions of the guide paths $312_1$ to $312_4$ are each set so as to correspond to a predetermined receiving portion 412 of a jig 410 in a state where the base portion 310 faces the jig 410 to be described later. For example, as shown in FIG. 2, the guide paths $312_1$ and $312_4$ may be set to be shorter than the guide paths $312_2$ and $312_3$ and to have larger inclination than the guide paths $312_2$ and $312_3$.

Each of the plurality of holding portions 320 is engaged with the corresponding guide path 312. In the example of FIG. 2, holding portions $320_1$ to $320_4$ are arranged in order from the right to the left in FIG. 2 so as to correspond to the guide paths $312_1$ to $312_4$, respectively.

Each holding portion 320 extends in the horizontal direction from the base portion 310 toward the measurement unit 200. The holding portion 320 may have a tubular shape in which the insert 14 can be arranged. The holding portion 320 is configured to be driven by the driving portion 340 so as to hold the insert 14 supported by the measurement unit 200. The holding portion 320 may be, for example, a vacuum chuck that suctions the insert 14 by negative pressure, or a mechanical chuck that physically clamps the insert 14. The holding portion 320 is configured to be driven by the driving portion 340 so as to move along the guide path 312 (see arrow Ar1 in FIG. 2).

The holding portion 320 may be configured to be pivotable (including rotation) around a virtual axis passing through a center thereof in the guide path 312 (see arrow Ar2 in FIG. 2). For example, the holding portion 320 may be pivoted while moving along the guide path 312, or may be pivoted when reaching an upper end portion or a lower end portion of the guide path 312. Therefore, a posture (pivot angle) of the holding portion 320 may be different between a state where the holding portion 320 is located at the upper end portion of the guide path 312 and a state where the holding portion 320 is located at the lower end portion of the guide path 312.

Each of the plurality of push-out members 330 has a rod shape. Each of the plurality of push-out members 330 is inserted into the corresponding holding portion 320 from a base end portion side. In the example of FIG. 2, push-out members $330_1$ to $330_4$ are arranged in order from the right to the left in FIG. 2 so as to correspond to the holding portions $320_1$ to $320_4$, respectively.

Each push-out member 330 is configured to be movable forward and backward along a longitudinal direction thereof. In a state where the holding portion 320 releases holding of the insert 14, the push-out member 330 moves forward toward a tip end portion of the holding portion 320, and thus the insert 14 in the holding portion 320 is pushed forward.

The driving portion 340 is configured to operate based on the control signal from the controller Ctr and drive each portion (the base portion 310, the holding portion 320, and the push-out member 330) of the holding unit 300. The driving portion 340 may be, for example, an articulated robot arm.

The driving portion 340 is configured to move the base portion 310 in an X-axis direction, a Y-axis direction, and a Z-axis direction in FIGS. 2 and 3. That is, the base portion 310 is configured to be movable in a direction approaching or separating from the measurement unit 200 (see arrow Ar3 in FIGS. 2 and 3), a direction in which the measurement unit 200 and the jig 410 are arranged (see arrow Ar4 in FIG. 2), and the up-down direction (see arrow Ar5 in FIG. 2).

The driving portion 340 is configured to pivot (including rotate) the base portion 310 with the X-axis serving as a central axis. That is, the base portion 310 is configured to be pivotable (including rotation) clockwise or counterclockwise when viewed from the X-axis direction (a direction from the holding unit 300 toward the measurement unit 200) (see arrow Ar6 in FIG. 2).

The jig unit 400 includes a plurality of the jigs 410 (receivers), a connection member 420, a pivot shaft 430, and a driving portion 440. Although the jig unit 400 includes two jigs 410 in the example of FIG. 3, the jig unit 400 may include three or more jigs 410. Hereinafter, one of the two jigs 410 shown in FIG. 3 is referred to as a "jig 410A", and the other is referred to as a "jig 410B".

Figure 4:
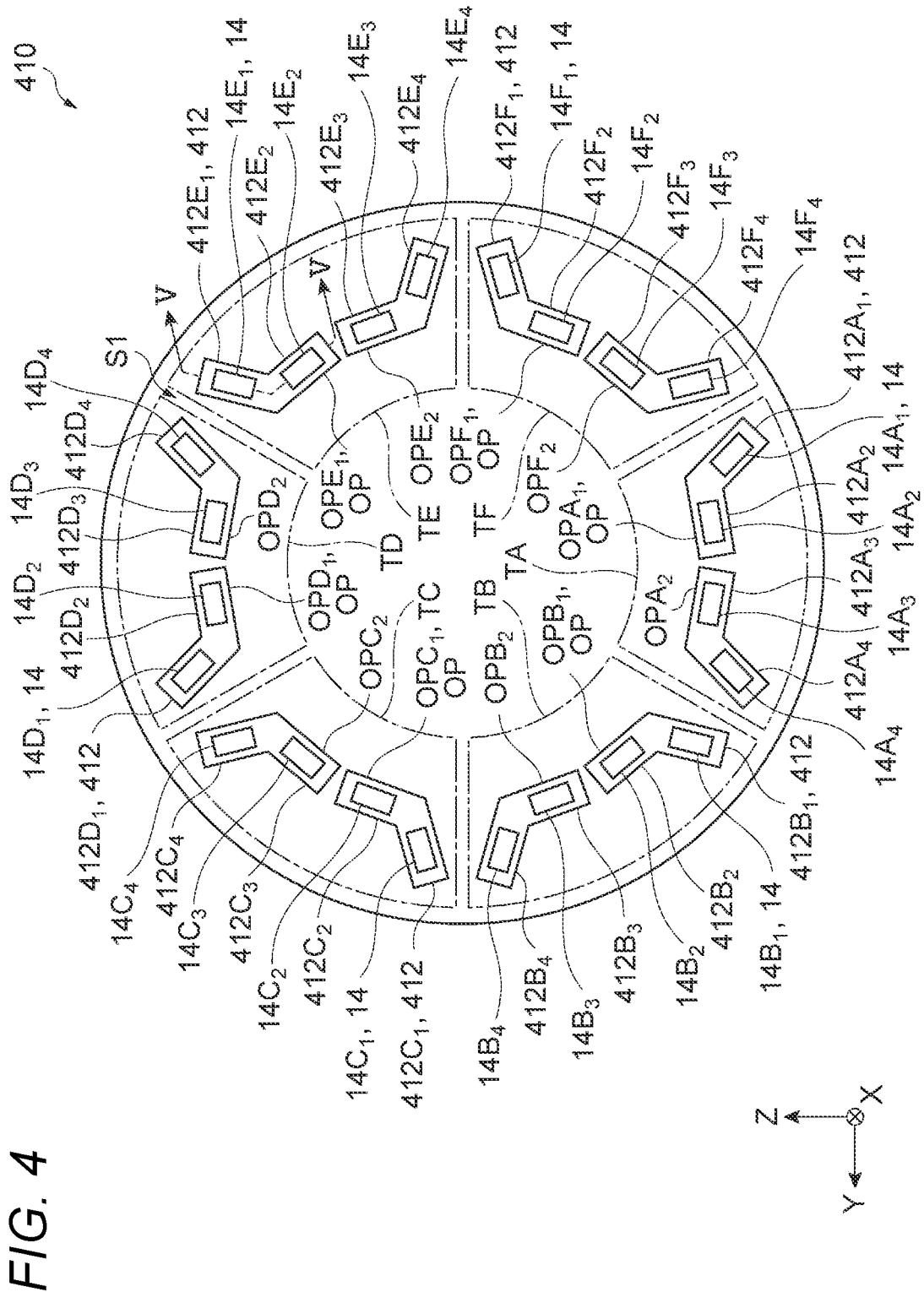
FIG. 4 is a front view showing an example of an insertion jig.

Each jig 410 is configured to temporarily hold the insert 14 to be inserted into the receiving portion 18 of the laminate 12. As shown in FIGS. 3 and 4, the jig 410 may have a columnar shape. A plurality of the receiving portions 412 are formed in the jig 410. In the example of FIGS. 3 and 4, 24 receiving portions 412 are formed in the jig 410. The receiving portions 412 may be arranged at predetermined intervals along an outer peripheral edge of the jig 410. Each receiving portion 412 may be a through hole that penetrates from one main surface S1 of the jig 410 to the other main surface S2 (see FIG. 5) located on a side opposite to the one main surface S1 so as to extend along the central axis Ax. The receiving portion 412 may also be a recessed portion that extends from the one main surface S1 of the jig 410 along the central axis Ax but does not reach the other main surface S2.

Figure 5:
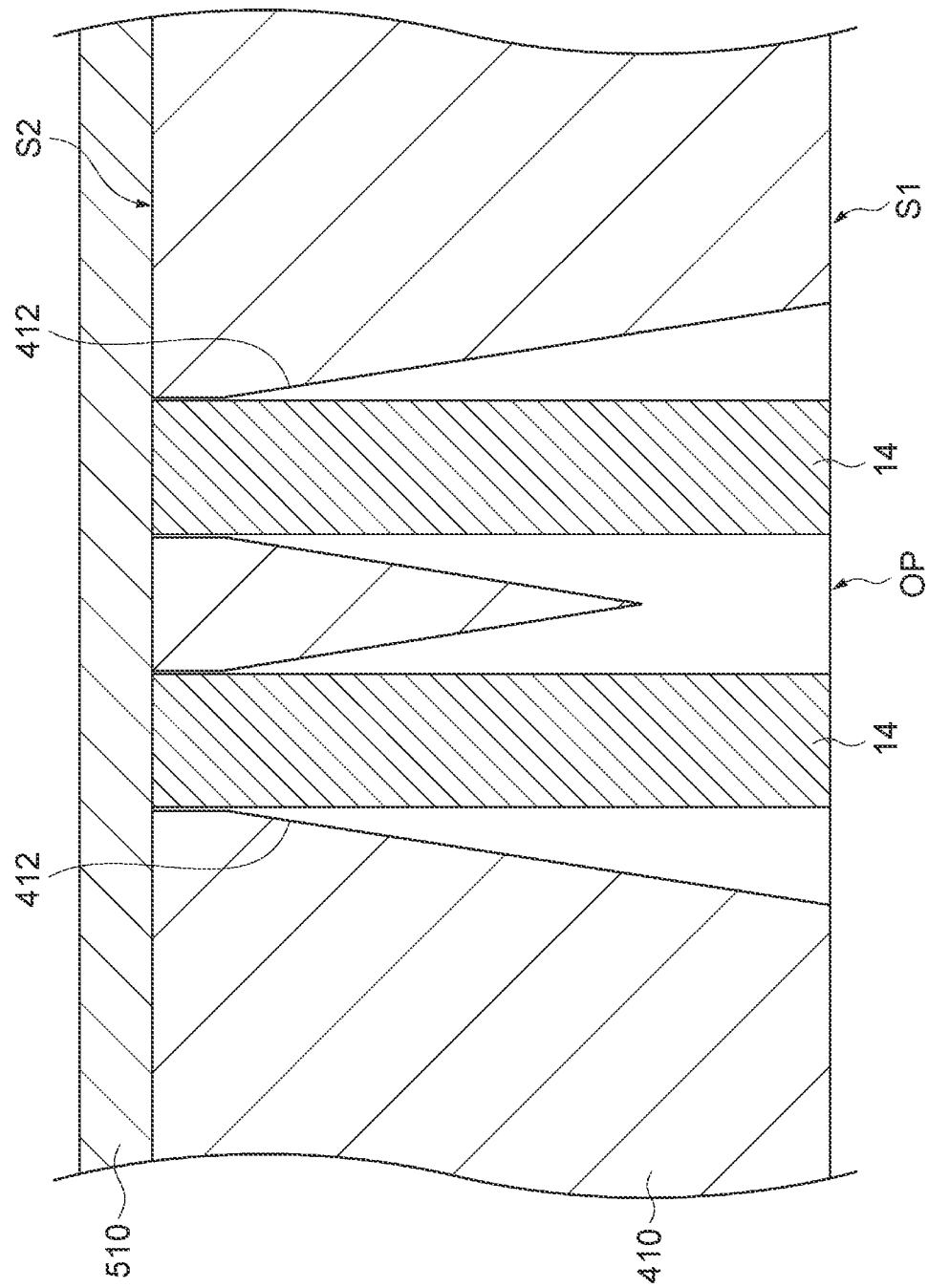
FIG. 5 is a cross-sectional view taken along line V-V of FIG. 4.

When the main surface S1 of the jig 410 is viewed from the X-axis direction, an opening shape and a direction of an opening of the receiving portion 412 in the main surface S1 are not particularly limited. The opening shape of the receiving portion 412 in the main surface S1 may be, for example, a rectangular shape, an arc shape, a bent shape, or the like. As shown in FIGS. 4 and 5, the opening of the receiving portion 412 in the main surface S1 may be integrated with the opening of another receiving portion 412 adjacent thereto in a peripheral direction so as to form one common opening portion OP.

When the main surface S2 of the jig 410 is viewed from the X-axis direction, an opening shape and a direction of an opening of the receiving portion 412 in the main surface S2 are not particularly limited. The opening shape of the receiving portion 412 in the main surface S2 may be, for example, a rectangular shape, an arc shape, a bent shape, or the like. As shown in FIG. 5, the opening of the receiving portion 412 in the main surface S2 may not be integrated with the opening of another receiving portion 412 adjacent thereto in the peripheral direction.

As shown in FIG. 5, two receiving portions 412 that form the one common opening portion OP in the main surface S1 and form the openings independent of each other in the main surface S2 may extend so as to penetrate the jig 410 from the main surface S1 to the main surface S2. In this case, each of the two receiving portions 412 may be configured such that a cross-sectional area thereof decreases from the main surface S1 toward the main surface S2.

As shown in FIG. 5, each of the two receiving portions 412 may include a base end portion whose opening area is substantially constant on a side closer to the main surface S2 (a base end portion where a cross-sectional shape of an opening thereof substantially does not change). The cross-sectional shape of the opening of the base end portion may be set to be substantially the same as a cross-sectional shape of the insert 14 or slightly larger than the cross-sectional shape of the insert 14. In this case, the jig 410 can easily hold the insert 14 at the base end portion.

Here, when the main surface S1 of the jig 410 is viewed from the X-axis direction, the main surface S1 may include a plurality of regions (six regions TA to TF in the example of FIG. 4). The plurality of regions respectively correspond to the plurality of regions (six regions RA to RF in the example of FIG. 1) of the laminate 12, and may be arranged along the outer peripheral edge. In the example of FIG. 4, the regions TA to TF may be arranged clockwise relative to a center of the jig 410 when the main surface S1 is viewed from the X-axis direction. In each of the regions TA to TF, a receiving portion group including the same number of receiving portions 412 (four receiving portions 412 in the example of FIG. 4) may be arranged.

In the present specification, the four receiving portions 412 arranged in the region TA are referred to as "receiving portions 412A", and these four receiving portions 412A are referred to as a "receiving portion $412A_1$", a "receiving portion $412A_2$", a "receiving portion $412A_3$", and a "receiving portion $412A_4$", respectively. The receiving portions $412A_1$ to $412A_4$ may be arranged clockwise relative to the center of the jig 410 when the main surface S1 is viewed from the X-axis direction. In the example of FIG. 4, the receiving portions $412A_1$ and $412A_2$ form one common opening portion $OPA_1$, and the receiving portions $412A_3$ and $412A_4$ form one common opening portion $OPA_2$. The same applies to the receiving portions 412 in the other regions TB to TF.

In the example shown in FIG. 4, the receiving portions $412A_1$ and $412A_4$ extend along a radial direction such that end portions thereof on a side closer to the central axis Ax face an inner side of the region TA. The receiving portions $412A_2$ and $412A_3$ extend along a peripheral direction. An end portion, which is located on a peripheral direction outer side in the region TA, of the receiving portion $412A_2$ is integrated with an end portion, which is located on a side closer to the center of the jig 410, of the receiving portion $412A_1$ so as to form the one common opening portion $OPA_1$. An end portion, which is located on the peripheral direction outer side in the region TA, of the receiving portion $412A_3$ is integrated with an end portion, which is located on a side closer to the center of the jig 410, of the receiving portion $412A_4$ so as to form the one common opening portion $OPA_2$. Therefore, in the example shown in FIG. 4, each of the opening portions $OPA_1$ and $OPA_2$ has a "V" shape, and is arranged in the main surface S1 in such a manner that a top portion thereof faces the center of the jig 410.

Referring back to FIG. 3, the connection member 420 is configured to connect the plurality of jigs 410. The pivot shaft 430 is connected to the connection member 420 so as to extend along the X-axis direction. The pivot shaft 430 is driven by the driving portion 440 so as to be pivotable (including rotation) around a virtual axis passing through a center portion of the pivot shaft 430. Along with the pivoting of the pivot shaft 430, the plurality of jigs 410 are pivoted clockwise or counterclockwise via the connection member 420 (see arrow Ar7 in FIG. 3).

The driving portion 440 is configured to operate based on the control signal from the controller Ctr so as to drive the pivot shaft 430. The driving portion 440 may be, for example, a motor.

The closing unit 500 includes a closing member 510 and a driving portion 520. The closing member 510 is configured to close the opening of the receiving portion 412 in the main surface S2 in a state where the closing member 510 is arranged on the main surface S2 of the jig 410. As shown in FIG. 3, the closing member 510 may have a plate-like shape expanding along the vertical direction.

The driving portion 520 is configured to operate based on the control signal from the controller Ctr so as to drive the closing member 510. The driving portion 520 may be, for example, a linear motion actuator. The driving portion 520 is configured to move the closing member 510 in the X-axis direction in FIG. 3. That is, the closing member 510 is configured to be movable in a direction approaching or separating from the jig 410 (see arrow Ar8 in FIG. 3).

The holding unit 600 includes a jig 610 and a driving portion 620. For example, the jig 610 may be configured to hold the laminate 12 formed by a press device (not shown) and convey the laminate 12 to the insertion device 100. The jig 610 includes a base portion 611 and an insertion post 612. The base portion 611 may have a plate-like shape.

The insertion post 612 is located at a substantially central portion of the base portion 611, and protrudes from a main surface of the base portion 611 along a direction orthogonal to the main surface. The insertion post 612 has a columnar shape and has an outer shape corresponding to the shaft hole 12a of the laminate 12. The insertion post 612 is inserted into the shaft hole 12a and one main surface of the laminate 12 is abutted against the base portion 611 so as to place the laminate 12 on the jig 610. A posture of the jig 610 may be set in an upright state (a state where the insertion post 612 extends upward) while the laminate 12 is placed on the base portion 611 until the jig 610 arrives at the insertion device 100 from the press device. Thereafter, when the jig 610 arrives at the insertion device 100, the posture of the jig 610 may be set in a laterally tilted state (a state where the insertion post 612 extends along the horizontal direction toward the jig 410), and the laminate 12 may be held by the insertion post 612.

The driving portion 620 is configured to operate based on the control signal from the controller Ctr so as to drive the jig 610 that has arrived at the insertion device 100. The driving portion 620 may be, for example, a linear motion actuator. The driving portion 620 is configured to move the jig 610 in the X-axis direction in FIG. 3. That is, the jig 610 is configured to be movable in a direction approaching or separating from the jig 410 (see arrow Ar10 in FIG. 3).

The push-out unit 700 is configured to push out the insert 14 held by the receiving portion 412 of the jig 410 toward the receiving portion 18 of the laminate 12 held by the jig 610. The push-out unit 700 includes a base portion 710, a plurality of push-out members 720, and a driving portion 730.

As shown in FIG. 3, the base portion 710 may have a plate-like shape expanding along the vertical direction. The plurality of push-out members 720 protrude from a main surface of the base portion 710 along a direction orthogonal to the main surface. The plurality of push-out members 720 are arranged at positions corresponding to the respective receiving portions 412 of the jig 410 in a state where the base portion 710 faces the main surface S1 of the jig 410.

The driving portion 730 is configured to operate based on the control signal from the controller Ctr so as to drive the base portion 710. The driving portion 730 may be, for example, a linear motion actuator. The driving portion 730 is configured to move the base portion 710 in the X-axis direction in FIG. 3. That is, the base portion 710 is configured to be movable in the direction approaching or separating from the jig 410 (see the arrow Ar10 in FIG. 3).

The controller Ctr is configured to generate a signal for operating each driving portion of the insertion device 100 based on, for example, a program recorded in a recording medium (not shown), an operation input from an operator, or the like. The controller Ctr is configured to transmit the signal to each driving portion of the insertion device 100.

Insertion Method of Insert

Next, a method of inserting the insert 14 (a method of manufacturing the rotor laminated iron core 10) will be described with reference to FIGS. 2, 3, 6, 7A-7B, 8A-8B, and 9A-9B. As an initial state of the insertion device 100, it is assumed that the plurality of holding portions 320 are located at the upper end portion of the corresponding guide path 312 and are arranged in a line in the Y-axis direction. In addition, in the initial state, as shown in FIG. 3, it is assumed that the jig 410A and the closing member 510 are arranged in the X-axis direction, and the jig 410B, the laterally tilted jig 610 that holds the laminate 12, and the base portion 710 are arranged in the X-axis direction.

First, as shown in FIG. 2, four inserts 14 are placed on the measurement unit 200 by a conveyance mechanism (for example, a robot arm, not shown) or the like. The measurement unit 200 measures the weight of each insert 14 and transmits such data to the controller Ctr. The controller Ctr may determine whether the weight of the insert 14 is within a predetermined range based on the data. When the controller Ctr determines that the weight of the insert 14 is not within the predetermined range, the controller Ctr may determine that there is a defect such as chipping or cracking in the insert 14 or an error has occurred, such as a specific number or more of the inserts 14 are erroneously placed on the measurement unit 200. In this case, the controller Ctr may notify the operator of the occurrence of the error, or may control the conveyance mechanism so as to exclude the inserts 14, which are targets of the error, from the measurement unit 200.

Figure 6:
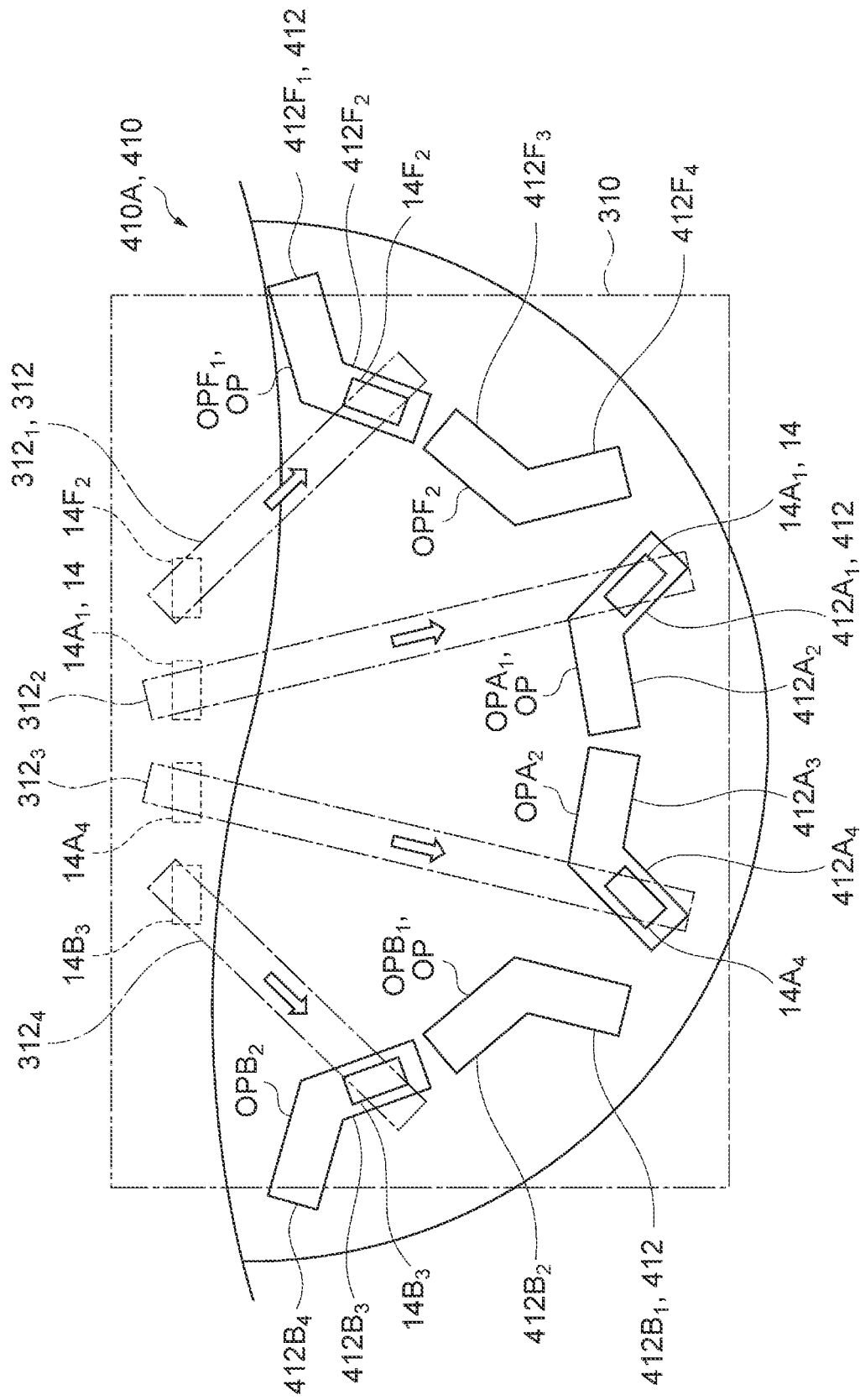
FIG. 6 shows a method of inserting an insert into the insertion jig.
Figure 8A:
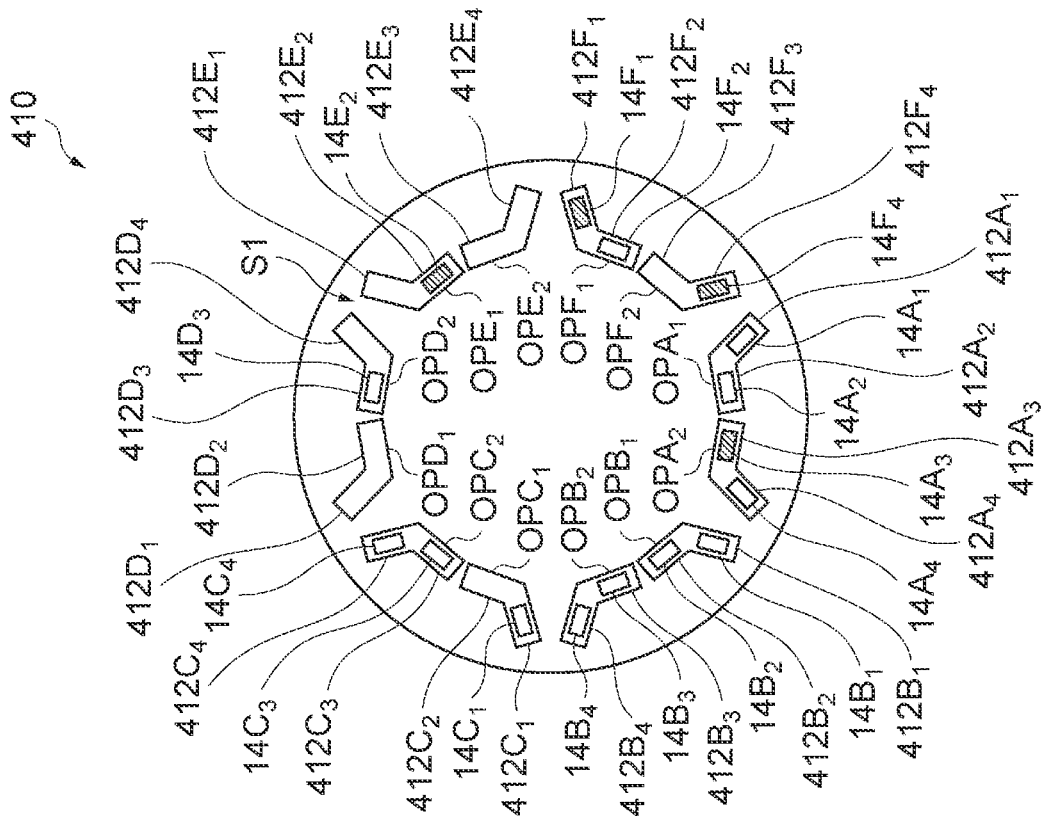
FIGS. 8A and 8B show the method of inserting the insert into the insertion jig.
Figure 8B:
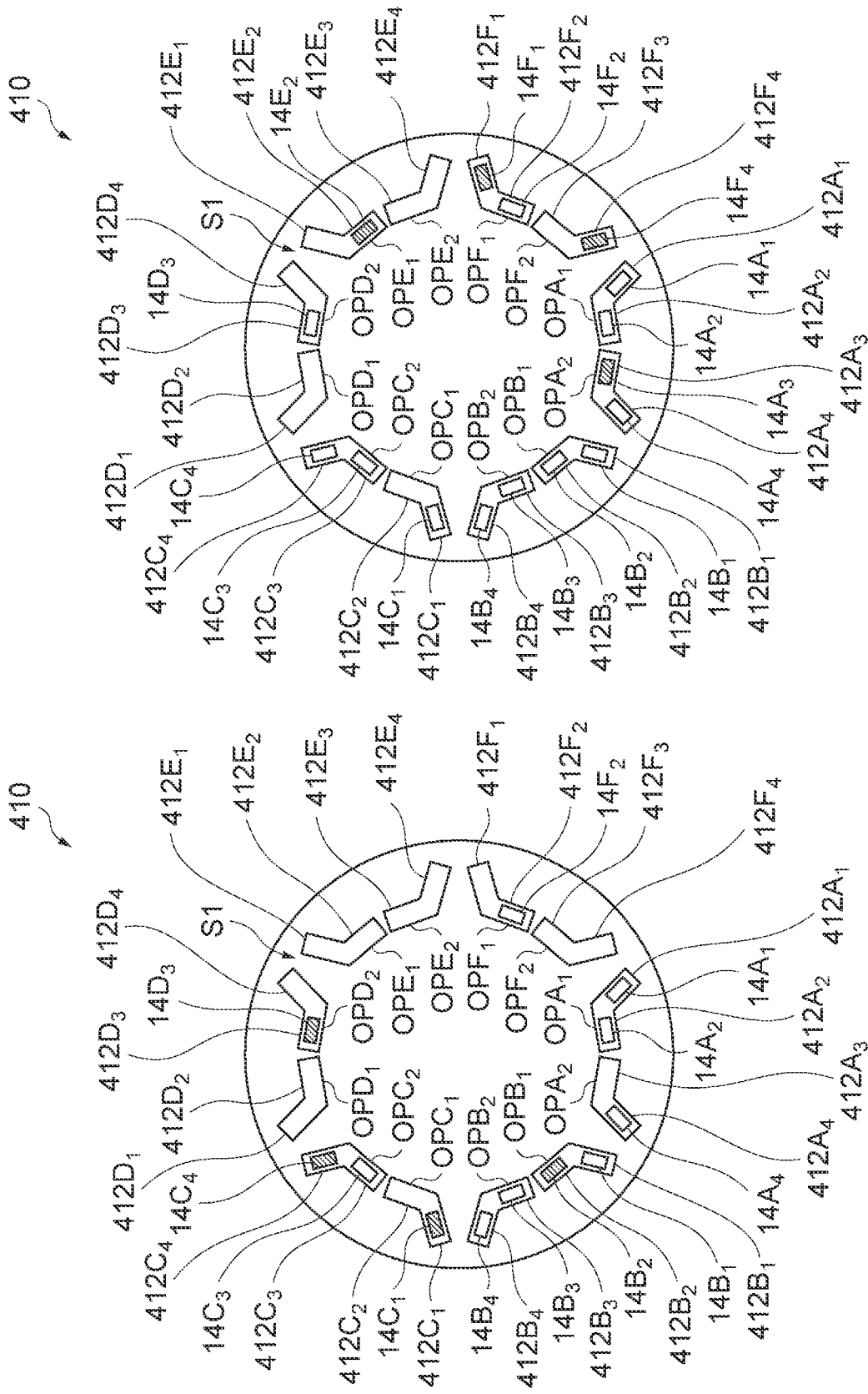

Subsequently, the controller Ctr instructs the driving portion 340 to bring the base portion 310 close to the measurement unit 200 and cause the four holding portions 320 to hold the four inserts 14 on the measurement unit 200, respectively. Here, as shown in FIGS. 2 and 6, it is assumed that the holding portion $320_1$ holds an insert $14F_2$, the holding portion $320_2$ holds the insert $14A_1$, the holding portion $320_3$ holds the insert $14A_4$, and the holding portion $320_4$ holds an insert $14B_3$.

Subsequently, the controller Ctr instructs the driving portion 340 to move the base portion 310 such that the base portion 310 faces the jig 410A in the X-axis direction (see FIGS. 2 and 3). At this time, the controller Ctr may instruct the driving portion 340 to pivot the base portion 310 so as to change a posture of the base portion 310 according to a position of the receiving portion 412 of the jig 410A into which the insert 14 held by the holding portion 320 is inserted.

In addition, the controller Ctr instructs the driving portion 340 to move the holding portion 320 such that the holding portion 320 is located at the lower end portion of the guide path 312 (see FIG. 3) during, before and after the movement of the base portion 310. At this time, as shown in FIG. 6, the insert $14F_2$ held by the holding portion $320_1$ is displaced so as to overlap a receiving portion $412F_2$ of the jig 410A when viewed from the X-axis direction and to take a posture corresponding to an opening of the receiving portion $412F_2$ in the main surface S1. The insert $14A_1$ held by the holding portion $320_2$ is displaced so as to overlap the receiving portion $412A_1$ of the jig 410A when viewed from the X-axis direction and to take a posture corresponding to an opening of the receiving portion $412A_1$ in the main surface S1. The insert $14A_4$ held by the holding portion $320_3$ is displaced so as to overlap the receiving portion $412A_4$ of the jig 410A when viewed in the X-axis direction and to take a posture corresponding to an opening of the receiving portion $412A_4$ in the main surface S1. The insert $14B_3$ held by the holding portion $320_4$ is displaced so as to overlap a receiving portion $412B_3$ of the jig 410A when viewed in the X-axis direction and to take a posture corresponding to an opening of the receiving portion $412B_3$ in the main surface S1.

Subsequently, the controller Ctr instructs the driving portions 340 and 520 to insert the insert 14 into the receiving portion 412 of the jig 410A while abutting the closing member 510 against the main surface S2 of the jig 410A (see FIG. 5). For example, the controller Ctr instructs the driving portion 340 to move the push-out member 330 forward in a state where the holding (chucking) of the insert 14 held by the holding portion 320 is released, so that the insert 14 is inserted into the receiving portion 412 of the jig 410A.

Specifically, as indicated by diagonal lines in FIGS. 6 and 7A, the insert $14F_2$ held by the holding portion $320_1$ is inserted into the receiving portion $412F_2$ of the jig 410A. That is, the insert $14F_2$ is arranged in the receiving portion $412F_2$ located on a lower side among two receiving portions $412F_1$ and $412F_2$ constituting an opening portion $OPF_1$. The insert $14A_1$ held by the holding portion $320_2$ is inserted into the receiving portion $412A_1$ of the jig 410A. That is, the insert $14A_1$ is arranged in the receiving portion $412A_1$ located on a lower side among the two receiving portions $412A_1$ and $412A_2$ constituting the opening portion $OPA_1$. The insert $14A_4$ held by the holding portion $320_3$ is inserted into the receiving portion $412A_4$ of the jig 410A. That is, the insert $14A_4$ is arranged in the receiving portion $412A_4$ located on a lower side among the two receiving portions $412A_3$ and $412A_4$ constituting the opening portion $OPA_2$. The insert $14B_3$ held by the holding portion $320_4$ is inserted into the receiving portion $412B_3$ of the jig 410A. That is, the insert $14B_3$ is arranged in the receiving portion $412B_3$ located on a lower side among two receiving portions $412B_3$ and $412B_4$ constituting an opening portion $OPB_2$.

Between a process in which the holding portion 320 holds the insert 14 from the measurement unit 200 and a process in which the insert 14 is inserted into the receiving portion 412, four new inserts 14 may be placed on the measurement unit 200 by the conveyance mechanism. The four new inserts 14 are also inserted into the corresponding receiving portions 412 by the holding unit 300, similarly to the inserts 14 that have already been inserted into the holding portions 320, after being measured by the measurement unit 200. By repeating this series of processes, the inserts 14 are inserted into all the receiving portions 412 of the jig 410A.

Here, a case where four new inserts 14 following the inserts $14F_2$, $14A_1$, $14A_4$, and $14B_3$ are inserts $14A_2$, $14B_1$, $14B_4$, and $14C_3$ will be described. As indicated by a diagonal line in FIG. 7B, the insert $14A_2$ held by the holding portion $320_1$ is inserted into the receiving portion $412A_2$ of the jig 410A. That is, the insert $14A_2$ is arranged in the receiving portion $412A_2$ located on an upper side among the two receiving portions $412A_1$ and $412A_2$ constituting the opening portion $OPA_1$. At this time, since the insert $14A_1$ has already been inserted into the receiving portion $412A_1$, dropping of the insert $14A_2$ into the receiving portion $412A_1$ is prevented. The insert $14B_1$ held by the holding portion $320_2$ is inserted into a receiving portion $412B_1$ of the jig 410A. That is, the insert $14B_1$ is arranged in the receiving portion 412B$_1$ located on a lower side among two receiving portions 412B$_1$ and 412B$_2$ constituting an opening portion OPB$_1$. The insert 14B$_4$ held by the holding portion 320$_3$ is inserted into the receiving portion 412B$_4$ of the jig 410A. That is, the insert 14B$_4$ is arranged in the receiving portion 412B$_4$ located on an upper side among the two receiving portions 412B$_3$ and 412B$_4$ constituting the opening portion OPB$_2$. At this time, since the insert 14B$_3$ has already been inserted into the receiving portion 412B$_3$, dropping of the insert 14B$_4$ into the receiving portion 412B$_3$ is prevented. The insert 14C$_3$ held by the holding portion 320$_4$ is inserted into a receiving portion 412C$_3$ of the jig 410A. That is, the insert 14C$_3$ is arranged in the receiving portion 412C$_3$ located on a lower side among two receiving portions 412C$_3$ and 412C$_4$ constituting an opening portion OPC$_2$.

Next, a case where four new inserts 14 following the inserts 14A$_2$, 14B$_1$, 14B$_4$, and 14C$_3$ are inserts 14B$_2$, 14C$_1$, 14C$_4$, and 14D$_3$ will be described. As indicated by a diagonal line in FIG. 8A, the insert 14B$_2$ held by the holding portion 320$_1$ is inserted into the receiving portion 412B$_2$ of the jig 410A. That is, the insert 14B$_2$ is arranged in the receiving portion 412B$_2$ located on an upper side among the two receiving portions 412B$_1$ and 412B$_2$ constituting the opening portion OPB$_1$. At this time, since the insert 14B$_1$ has already been inserted into the receiving portion 412B$_1$, dropping of the insert 14B$_2$ into the receiving portion 412B$_1$ is prevented. The insert 14C$_1$ held by the holding portion 320$_2$ is inserted into a receiving portion 412C$_1$ of the jig 410A. That is, the insert 14C$_1$ is arranged in the receiving portion 412C$_1$ located on a lower side among two receiving portions 412C$_1$ and 412C$_2$ constituting an opening portion OPC$_1$. The insert 14C$_4$ held by the holding portion 320$_3$ is inserted into the receiving portion 412C$_4$ of the jig 410A. That is, the insert 14C$_4$ is arranged in the receiving portion 412C$_4$ located on an upper side among the two receiving portions 412C$_3$ and 412C$_4$ constituting the opening portion OPC$_2$. At this time, since the insert 14C$_3$ has already been inserted into the receiving portion 412C$_3$, dropping of the insert 14C$_4$ into the receiving portion 412C$_3$ is prevented. The insert 14D$_3$ held by the holding portion 320$_4$ is inserted into a receiving portion 412D$_3$ of the jig 410A. That is, the insert 14D$_3$ is arranged in the receiving portion 412D$_3$ located on a lower side among two receiving portions 412D$_3$ and 412D$_4$ constituting an opening portion OPD$_2$.

Next, a case where four new inserts 14 following the inserts 14B$_2$, 14C$_1$, 14C$_4$, and 14D$_3$ are inserts 14E$_2$, 14F$_1$, 14F$_4$, and 14A$_3$ will be described. As indicated by a diagonal line in FIG. 8B, the insert 14E$_2$ held by the holding portion 320$_1$ is inserted into a receiving portion 412E$_2$ of the jig 410A. That is, the insert 14E$_2$ is arranged in the receiving portion 412E$_2$ located on a lower side among two receiving portions 412E$_1$ and 412E$_2$ constituting an opening portion OPE$_1$. The insert 14F$_1$ held by the holding portion 320$_2$ is inserted into the receiving portion 412F$_1$ of the jig 410A. That is, the insert 14F$_1$ is arranged in the receiving portion 412F$_1$ located on an upper side among the two receiving portions 412F$_1$ and 412F$_2$ constituting the opening portion OPF$_1$. At this time, since the insert 14F$_2$ has already been inserted into the receiving portion 412F$_2$, dropping of the insert 14F$_1$ into the receiving portion 412F$_2$ is prevented. The insert 14F$_4$ held by the holding portion 320$_3$ is inserted into a receiving portion 412F$_4$ of the jig 410A. That is, the insert 14F$_4$ is arranged in the receiving portion 412F$_4$ located on a lower side among two receiving portions 412F$_3$ and 412F$_4$ constituting an opening portion OPF$_2$. The insert 14A$_3$ held by the holding portion 320$_4$ is inserted into the receiving portion 412A$_3$ of the jig 410A. That is, the insert 14A$_3$ is arranged in the receiving portion 412A$_3$ located on an upper side among the two receiving portions 412A$_3$ and 412A$_4$ constituting the opening portion OPA$_2$. At this time, since the insert 14A$_4$ has already been inserted into the receiving portion 412A$_4$, dropping of the insert 14A$_3$ into the receiving portion 412A$_4$ is prevented.

Next, a case where four new inserts 14 following the inserts 14E$_2$, 14F$_1$, 14F$_4$, and 14A$_3$ are inserts 14D$_2$, 14E$_1$, 14E$_4$, and 14F$_3$ will be described. As indicated by a diagonal line in FIG. 9A, the insert 14D$_2$ held by the holding portion 320$_1$ is inserted into a receiving portion 412D$_2$ of the jig 410A. That is, the insert 14D$_2$ is arranged in the receiving portion 412D$_2$ located on a lower side among two receiving portions 412D$_1$ and 412D$_2$ constituting an opening portion OPD$_1$. The insert 14E$_1$ held by the holding portion 320$_2$ is inserted into the receiving portion 412E$_1$ of the jig 410A. That is, the insert 14E$_1$ is arranged in the receiving portion 412E$_1$ located on an upper side among the two receiving portions 412E$_1$ and 412E$_2$ constituting the opening portion OPE$_1$. At this time, since the insert 14E$_2$ has already been inserted into the receiving portion 412E$_2$, dropping of the insert 14E$_1$ into the receiving portion 412E$_2$ is prevented. The insert 14E$_4$ held by the holding portion 320$_3$ is inserted into a receiving portion 412E$_4$ of the jig 410A. That is, the insert 14E$_4$ is arranged in the receiving portion 412E$_4$ located on a lower side among two receiving portions 412E$_3$ and 412E$_4$ constituting an opening portion OPE$_2$. The insert 14F$_3$ held by the holding portion 320$_4$ is inserted into the receiving portion 412F$_3$ of the jig 410A. That is, the insert 14F$_3$ is arranged in the receiving portion 412F$_3$ located on an upper side among the two receiving portions 412F$_3$ and 412F$_4$ constituting the opening portion OPF$_2$. At this time, since the insert 14F$_4$ has already been inserted into the receiving portion 412F$_4$, dropping of the insert 14F$_3$ into the receiving portion 412F$_4$ is prevented.

Next, a case where the four new inserts 14 following the inserts 14D$_2$, 14E$_1$, 14E$_4$, and 14F$_3$ are inserts 14C$_2$, 14D$_1$, 14D$_4$, and 14E$_3$ will be described. As indicated by a diagonal line in FIG. 9B, the insert 14C$_2$ held by the holding portion 320$_1$ is inserted into the receiving portion 412C$_2$ of the jig 410A. That is, the insert 14C$_2$ is arranged in the receiving portion 412C$_2$ located on an upper side among the two receiving portions 412C$_1$ and 412C$_2$ constituting the opening portion OPC$_1$. At this time, since the insert 14C$_1$ has already been inserted into the receiving portion 412C$_1$, dropping of the insert 14C$_2$ into the receiving portion 412C$_1$ is prevented. The insert 14D$_1$ held by the holding portion 320$_2$ is inserted into the receiving portion 412D$_1$ of the jig 410A. That is, the insert 14D$_1$ is arranged in the receiving portion 412D$_1$ located on an upper side among the two receiving portions 412D$_1$ and 412D$_2$ constituting the opening portion OPD$_1$. At this time, since the insert 14D$_2$ has already been inserted into the receiving portion 412D$_2$, dropping of the insert 14D$_1$ into the receiving portion 412D$_2$ is prevented. The insert 14D$_4$ held by the holding portion 320$_3$ is inserted into the receiving portion 412D$_4$ of the jig 410A. That is, the insert 14D$_4$ is arranged in the receiving portion 412D$_4$ located on an upper side among the two receiving portions 412D$_3$ and 412D$_4$ constituting the opening portion OPD$_2$. At this time, since the insert 14D$_3$ has already been inserted into the receiving portion 412D$_3$, dropping of the insert 14D$_4$ into the receiving portion 412D$_3$ is prevented. The insert 14E$_3$ held by the holding portion 320$_4$ is inserted into the receiving portion 412E$_3$ of the jig 410A. That is, the insert 14E$_3$ is arranged in the receiving portion 412E$_3$ located on an upper side among the two receiving portions 412E$_3$ and 412E$_4$ constituting the opening portion OPE$_2$. At this time, since the insert 14E$_4$ has already been inserted into the receiving portion 412E$_4$, dropping of the insert 14E$_3$ into the receiving portion 412E$_4$ is prevented.

When the inserts 14 are inserted into all the receiving portions 412 of the jig 410A, the controller Ctr instructs the driving portion 440 to pivot the jigs 410A and 410B via the connection member 420 and the pivot shaft 430 until positions of the jigs 410A and 410B are exchanged (see FIG. 3). As a result, the jig 410A, the laterally tilted jig 610 that holds the laminate 12, and the base portion 710 are arranged in the X-axis direction. On the other hand, the jig 410B whose position is exchanged with that of the jig 410A and the closing member 510 are arranged in the X-axis direction. As a result, the receiving portion 18 of the laminate 12, the receiving portion 412 of the jig 410A, and the push-out member 720 overlap each other in the X-axis direction.

Subsequently, the controller Ctr instructs the driving portions 620 and 730 to sandwich the jig 410A between the laminate 12, the base portion 611, and the base portion 710. As a result, the push-out members 720 push the inserts 14 in the receiving portions 412 toward the receiving portions 18 of the laminate 12. As a result, the inserts 14 are inserted into all the receiving portions 18 of the laminate 12 substantially at the same time.

Here, a process of inserting each insert 14 from the jig 410A into the receiving portion 18 of the laminate 12 may be performed while the insert 14 is inserted into the receiving portion 412 of the jig 410B. In order to insert the insert 14 into the receiving portion 18 of the new laminate 12, after this process is completed, the controller Ctr may instruct the driving portion 440 to pivot the jigs 410A and 410B again such that the positions of the jigs 410A and 410B are exchanged. Thereafter, the insert 14 may be inserted from the receiving portion 412 of the jig 410B toward the receiving portion 18 of the new laminate 12 by the push-out member 720.

The jig 610 that holds the laminate 12 where the insert 14 is inserted into the receiving portion 18 is in an upright state, and is conveyed to a resin injection device (not shown). For example, the resin injection device may be configured to melt a resin material (for example, a resin tablet, resin powder, or the like) in a resin pot and inject the resin material into the receiving portion 18 in a state where the laminate 12 is sandwiched together with the jig 610 by a support mold and a heating mold in which the resin material is arranged in the resin pot. Thereafter, the molten resin injected into the receiving portion 18 is solidified to complete the rotor laminated iron core 10.

Effect

According to the above example, the holding portion 320 is displaced so as to make a posture of the insert 14 correspond to the receiving portion 412, and then the insert 14 is inserted into the receiving portion 412. Therefore, even if the plurality of receiving portions 412 have different forms (shapes, postures, and the like), the plurality of inserts 14 can be inserted into the corresponding receiving portions 412 substantially at the same time. Therefore, the rotor laminated iron core 10 can be efficiently produced.

According to the above example, the insert 14 can be firstly inserted into the receiving portion 412 located on the relatively lower side in the opening portion OP, and then another insert 14 can be inserted into the receiving portion 412 located on the relatively upper side in the opening portion OP. In this case, it is possible to prevent a situation in which the insert 14 inserted into the opening portion OP at first moves downward and interferes with the insert 14 inserted into the opening portion OP later. Therefore, it is possible to appropriately arrange the insert 14 in the receiving portion 412.

According to the above example, the one insert 14 and the other insert 14 held by the holding portion 320 can be inserted into the receiving portions 412 in different regions of the jig 410 substantially at the same time. For example, the inserts 14 can be inserted into the receiving portions 412A$_1$ and 412A$_4$ in the region TA, the receiving portion 412F$_2$ in the region TF, and the receiving portion 412B$_3$ in the region TB substantially at the same time. That is, all the inserts 14 held by the holding portion 320 may not be inserted into the receiving portions 412 in the same region of the jig 410 substantially at the same time. In this case, since the receiving portions 412 into which the inserts 14 are to be inserted are located relatively apart from each other, displacement of the holding portion 320 is less likely to be restricted. Therefore, since all the holding portions 320 can be effectively used, the rotor laminated iron core 10 can be more efficiently produced.

According to the above example, the insert 14 can be inserted into the receiving portion 412 by pushing the insert 14 by the push-out member 330 from the holding portion 320 toward the receiving portion 412 of the jig 410. In addition, the insert 14 can be inserted into the receiving portion 18 by pushing the receiving portion 412 by the push-out member 720 from the jig 410 toward the receiving portion 18 of the laminate 12. In this case, it is possible to quickly insert the insert 14 into the receiving portions 412 and 18 with a simple configuration.

According to the above example, the insert 14 can be inserted into the receiving portion 412 of the jig 410 from the holding portion 320 in a state where the closing member 510 is arranged on the main surface S2 of the jig 410. In this case, when the insert 14 is inserted into the receiving portion 412, the insert 14 is prevented from falling off from the receiving portion 412. Therefore, it is possible to more reliably arrange the insert 14 in the receiving portion 412.

According to the above example, after the insert 14 is once inserted into the receiving portion 412 of the jig 410 and the posture of the insert 14 is adjusted in the receiving portion 412, the insert 14 can be inserted into the receiving portion 18 of the laminate 12 from the jig 410. In this case, it is possible to quickly and accurately insert the insert 14 into the receiving portion 18 of the laminate 12 that is a final transfer destination of the insert 14.

According to the above example, when the receiving portion 412 of the jig 410B is filled with the insert 14, the insert 14 may be transferred from the receiving portion 412 of the jig 410A to the receiving portion 18 of the laminate 12 that is the final transfer destination. In this case, since the filling and the transfer of the insert 14 are performed substantially at the same time, it is possible to more efficiently produce the rotor laminated iron core 10.

Modification

It should be understood that the disclosure in the present specification is illustrative and not restrictive in all respects. Various omissions, substitutions, changes, and the like may be made to the above example without departing from the scope of the claims and the spirit thereof.

(1) An assembly constituted by the plurality of inserts 14 may be inserted into one of the receiving portions 18 and 412. In this case, the plurality of inserts 14 may be arranged in the receiving portions 18 and 412 in a longitudinal direction of the receiving portions 18 and 412, or may be arranged in a direction intersecting the longitudinal direction. The plurality of inserts 14 may be inserted into one of the receiving portions 18 and 412 at the same time, or the plurality of inserts 14 may be inserted separately.

(2) A direction in which the insert 14 is inserted into the receiving portions 18 and 412 is not particularly limited. That is, the insertion direction may be a direction along the horizontal direction, may be an obliquely upward direction, may be an obliquely downward direction, may be a downward direction, or may be an upward direction. When the insert 14 is inserted into the receiving portions 18 and 412 from below, the insertion device 100 may further include a mechanism (for example, a shutter mechanism) that supports the insert 14 after the insert 14 is inserted into the receiving portions 18 and 412.

(3) The inserts 14 may be inserted into the plurality of receiving portions 412 in the same region of the jig 410 substantially at the same time.

(4) The inserts 14 may be inserted into the receiving portions 18 of one laminate 12 using a plurality of the jigs 410. For example, after the inserts 14 are inserted into a part of the plurality of receiving portions 18 from the receiving portions 412 of the jig 410A, the inserts 14 may be inserted into the remaining part of the plurality of receiving portions 18 from the receiving portions 412 of the jig 410B.

(5) The insert 14 may be directly inserted into the receiving portion 18 of the laminate 12 from the holding portion 320.

(6) The present technology may be applied when a resin material is arranged in a resin pot of a heating mold of a resin injection device. That is, the insert 14 may be a resin material (for example, a resin tablet or resin powder). Also in this case, after the insert 14 is once inserted into the receiving portion of the jig, the resin material may be inserted into the resin pot of the heating mold from the jig, or the resin material may be directly inserted into the resin pot of the heating mold from the holding portion 320.

(7) One guide path 312 may include a plurality of positions corresponding to at least two of the plurality of receiving portions 412 of the jig 410. In this case, the number of postures or positions that can be taken by one holding portion 320 is increased, and thus it is possible to use one guide path 312 to correspond to various types of receivers having different postures or positions. One guide path 312 may include, for example, a first position corresponding to one receiving portion 412 of the jig 410 and a second position corresponding to another receiving portion 412 of the jig 410. One guide path 312 may be formed of, for example, an elongated hole that branches into two in the middle so as to be directed from one end to the first position or the second position.

OTHER EXAMPLES

Example 1

According to an aspect of the present disclosure, a method for manufacturing an iron core product includes: a first operation of holding a first insert by a first holding portion provided in a holding unit and holding a second insert by a second holding portion provided in the holding unit; after the first operation, a second operation of displacing at least one of the first holding portion and the second holding portion such that a posture of the first insert corresponds to an opening of a first receiving portion provided in a first main surface of a first receiver and a posture of the second insert corresponds to an opening of a second receiving portion provided in the first main surface; and after the second operation, a third operation of inserting the first insert from the first holding portion into the first receiving portion and inserting the second insert from the second holding portion into the second receiving portion in a state where the holding unit is arranged to face the first main surface.

When an iron core product is manufactured, there is a process of inserting an insert (for example, a magnetic material, a resin tablet, or the like) into each of a plurality of receiving portions provided in a receiver (for example, a body, a jig, or the like constituting the iron core product). An opening shape of the receiving portion may vary depending on a type of the iron core product, such as a rectangular shape, an arc shape, or a bent shape. In addition, a direction of an opening of one receiving portion may be different from a direction of an opening of another insertion hole. For this reason, it is difficult to arrange inserts in all receiving portions at one time. Therefore, it is general that an operator or an operation robot inserts the inserts into the receiving portions one by one while adjusting postures of the inserts in accordance with forms (an opening shape of each receiving portion, a direction of an opening of each receiving portion, or the like) of the receiving portions, and thus a long working time is required. In particular, in recent years, for the purpose of improving performance of a motor, the number of receiving portions is increased, and opening shapes and opening postures of the receiving portions tend to diversify, and thus further improvement in productivity is demanded.

However, according to the Example 1, the first and second inserts are inserted into the first and second receiving portions, respectively, after postures of the first and second inserts are made to correspond to the first and second receiving portions, respectively, by displacing at least one holding portion. Therefore, even if the first and second receiving portions have different forms, the first and second inserts can be inserted into the first and second receiving portions substantially at the same time. Therefore, the iron core product can be efficiently produced.

Example 2

According to the above aspect, the method may further include: after the third operation, a fourth operation of holding a third insert by the first holding portion and holding a fourth insert by the second holding portion; after the fourth operation, a fifth operation of displacing at least one of the first holding portion and the second holding portion such that a posture of the third insert corresponds to an opening of a third receiving portion provided in the first main surface and a posture of the fourth insert corresponds to an opening of a fourth receiving portion provided in the first main surface; and after the fifth operation, a sixth operation of inserting the third insert from the first holding portion into the third receiving portion and inserting the fourth insert from the second holding portion into the fourth receiving portion in a state where the holding unit is arranged to face the first main surface.

Example 3

According to the above aspect, the openings of the first receiving portion and the fourth receiving portion in the first main surface may be integrally configured to form one common opening portion. In the sixth operation, a first portion among the opening portions corresponding to the opening of the fourth receiving portion may be located above a second portion among the opening portions corresponding to the opening of the first receiving portion so as to descend toward the second portion.

In this case, the first insert is firstly inserted into the second portion, which is located on a relatively lower side, of the opening portion, and then the third insert is inserted into the first portion, which is located on a relatively upper side, of the opening portion. Therefore, it is possible to prevent a situation in which the insert inserted into the opening portion at first moves downward and interferes with the insert inserted into the opening portion later. Therefore, it is possible to appropriately arrange the insert in the receiving portion.

Example 4

According to the above aspect, the iron core product may be a rotor iron core, the first receiving portion may be located in a first region of the first main surface, the second receiving portion is located in a second region of the first main surface, the second region being different from the first region, and the first region and the second region may correspond to different magnetic poles among a plurality of magnetic poles formed in the rotor iron core.

When there are a plurality of receiving portions in a predetermined region of the first receiver, the plurality of receiving portions tend to be close to each other. Therefore, even if an attempt is made to insert inserts substantially at the same time into the plurality of receiving portions in the predetermined region, it may be difficult to displace a holding portion due to a physical restriction of a holding unit. However, according to the Example 4, the first receiving portion is located in the first region, and the second receiving portion is located in the second region different from the first region. Therefore, since the first and second receiving portions are located relatively apart from each other, displacement of the holding portion is less likely to be restricted. Therefore, all holding portions can be effectively used, and thus the iron core product can be more efficiently produced.

Example 5

According to the above aspect, the first receiver may further include a second main surface located on a side opposite to the first main surface, each of the first receiving portion and the second receiving portion may be a through hole extending from the first main surface to the second main surface, and the third operation may include inserting the first insert from the first holding portion into the first receiving portion and inserting the second insert from the second holding portion into the second receiving portion in a state where the holding unit is arranged to face the first main surface and a closing member is arranged on the second main surface so as to close the openings of the first receiving portion and the opening of the second receiving portion in the second main surface.

In this case, when the insert is inserted into the receiving portion of the first receiver, the insert is prevented from falling off from the receiving portion. Therefore, it is possible to more reliably arrange the insert in the receiving portion of the first receiver.

Example 6

According to the above aspect, the method may further include, after the third operation, a seventh operation of inserting the first insert inserted in the first receiving portion into a fifth receiving portion of a second receiver and inserting the second insert inserted in the second receiving portion into a sixth receiving portion of the second receiver in a state where the first receiver and the second receiver are arranged such that the first receiving portion communicates with the fifth receiving portion and the second receiving portion communicates with the sixth receiving portion.

In this case, the insert is once inserted into the receiving portion of the first receiver, adjusted in posture in the receiving portion, and then further inserted into the receiving portion of the second receiver from the receiving portion of the first receiver. Therefore, it is possible to quickly and accurately insert the insert into the receiving portion of the second receiver that is a final transfer destination of the insert.

Example 7

According to the above aspect, the seventh operation may include inserting each insert arranged in all the receiving portions of the first receiver into corresponding receiving portions of the second receiver while inserting each inserts into all receiving portions of a third receiver.

In this case, in the seventh process, the insert is inserted into the receiving portion of the second receiver from the receiving portion of the first receiver substantially at the same time when the holding unit inserts the insert into the receiving portion of the third receiver different from the first and second receivers. That is, when one of the first and third receivers is filled with the insert, the insert is transferred from the other one of the first and third receivers to the final transfer destination. Therefore, since the filling and the transfer of the insert are performed substantially at the same time, it is possible to more efficiently produce the iron core product.

Example 8

According to another aspect of the present disclosure, a device for manufacturing an iron core product includes: a receiver including a first main surface, a first receiving portion provided with an opening in the first main surface, and a second receiving portion provided with an opening in the first main surface; a holding unit including a first holding portion configured to hold a first insert and a second holding portion configured to hold a second insert; and a control unit. The control unit is configured to execute: a first process of controlling the first holding portion and the second holding portion so as to cause the first holding portion to hold the first insert and cause the second holding portion to hold the second insert; after the first operation, a second process of controlling the holding unit to displace at least one of the first holding portion and the second holding portion such that a posture of the first insert corresponds to the opening of the first receiving portion and a posture of the second insert portion corresponds to the opening of the second receiving portion; after the second operation, a third process of controlling at least one of the receiver and the holding unit to arrange the holding unit relative to the receiver such that the holding unit faces the first main surface; and after the third operation, a fourth process of controlling the holding unit to insert the first insert from the first holding portion into the first receiving portion and insert the second insert from the second holding portion into the second receiving portion.

In this case, the same operational effects as those of the method of Example 1 can be obtained.

What is claimed is:

1. A method for manufacturing an iron core product, comprising:

a first operation of holding a first insert by a first holding portion provided in a holding unit and holding a second insert by a second holding portion provided in the holding unit;

after the first operation, a second operation of displacing at least one of the first holding portion and the second holding portion such that a posture of the first insert corresponds to an opening of a first receiving portion provided in a first main surface of a first receiver and a posture of the second insert corresponds to an opening of a second receiving portion provided in the first main surface; and after the second operation, a third operation of inserting the first insert from the first holding portion into the first receiving portion and inserting the second insert from the second holding portion into the second receiving portion in a state where the holding unit is arranged to face the first main surface.

2. The method according to claim 1, further comprising:

after the third operation, a fourth operation of holding a third insert by the first holding portion and holding a fourth insert by the second holding portion;

after the fourth operation, a fifth operation of displacing at least one of the first holding portion and the second holding portion such that a posture of the third insert corresponds to an opening of a third receiving portion provided in the first main surface and a posture of the fourth insert corresponds to an opening of a fourth receiving portion provided in the first main surface; and after the fifth operation, a sixth operation of inserting the third insert from the first holding portion into the third receiving portion and inserting the fourth insert from the second holding portion into the fourth receiving portion in a state where the holding unit is arranged to face the first main surface.

3. The method according to claim 2, wherein the opening of the first receiving portion and the opening of the fourth receiving portion in the first main surface are integrally configured to form one common opening portion, and in the sixth operation, a first portion of the common opening portion that is defined by the opening of the fourth receiving portion is located above a second portion of the common opening portion that is defined by the opening of the first receiving portion so as to descend toward the second portion.

4. The method according to claim 1, wherein the iron core product is a rotor iron core, the first receiving portion is located in a first region of the first main surface, the second receiving portion is located in a second region of the first main surface, the second region being different from the first region, and the first region and the second region correspond to different magnetic poles among a plurality of magnetic poles formed in the rotor iron core.

5. The method according to claim 1, wherein the first receiver further includes a second main surface located on a side opposite to the first main surface, each of the first receiving portion and the second receiving portion is a through hole extending from the first main surface to the second main surface, and the third operation includes inserting the first insert from the first holding portion into the first receiving portion and inserting the second insert from the second holding portion into the second receiving portion in a state where the holding unit is arranged to face the first main surface and a closing member is arranged on the second main surface so as to close the opening of the first receiving portion and the opening of the second receiving portion in the second main surface.

6. The method according to claim 1, further comprising:

after the third operation, a seventh operation of inserting the first insert inserted in the first receiving portion into a fifth receiving portion of a second receiver and inserting the second insert inserted in the second receiving portion into a sixth receiving portion of the second receiver in a state where the first receiver and the second receiver are arranged such that the first receiving portion communicates with the fifth receiving portion and the second receiving portion communicates with the sixth receiving portion.

7. The method according to claim 6, wherein the seventh operation includes inserting each insert arranged in all the receiving portions of the first receiver into corresponding receiving portions of the second receiver while inserting each inserts into all receiving portions of a third receiver.

* * * * *

UNITED STATES PATENT AND TRADEMARK OFFICE
CERTIFICATE OF CORRECTION

PATENT NO. : 11,969,923 B2
APPLICATION NO. : 17/744951
DATED : April 30, 2024
INVENTOR(S) : K. Yoshizumi It is certified that error appears in the above-identified patent and that said Letters Patent is hereby corrected as shown below:

In the Claims

Column 20, Line 44 (Claim 7, Line 5), please change "each inserts" to -- each insert --.

Signed and Sealed this
Twenty-second Day of October, 2024

Katherine Kelly Vidal
*Director of the United States Patent and Trademark Office*